United States Patent
Härkönen et al.

(10) Patent No.: US 6,221,974 B1
(45) Date of Patent: Apr. 24, 2001

(54) PROCESS FOR THE PREPARATION OF CREEP-RESISTANT POLYPROPYLENE BLOCK COPOLYMERS

(75) Inventors: Mika Härkönen, Vantaa; Bo Malm, Espoo; Anders Nymark, Porvoo, all of (FI)

(73) Assignee: Borealis Technology Oy, Porvoo (FI)

( * ) Notice: Subject to any disclaimer, the term of this patent is extended or adjusted under 35 U.S.C. 154(b) by 0 days.

(21) Appl. No.: 09/171,434

(22) PCT Filed: Apr. 18, 1997

(86) PCT No.: PCT/FI97/00240

§ 371 Date: Dec. 21, 1998

§ 102(e) Date: Dec. 21, 1998

(87) PCT Pub. No.: WO97/40080

PCT Pub. Date: Oct. 30, 1997

(30) Foreign Application Priority Data

Apr. 19, 1996 (FI) .......................................... 961722

(51) Int. Cl.[7] ............................. C08F 297/06; C08F 4/64
(52) U.S. Cl. ...................... 525/332; 525/321; 525/324; 525/314; 525/315; 525/247; 525/268; 526/73; 526/125; 502/132; 502/134
(58) Field of Search ...................... 526/73, 125; 502/132, 502/134, 153; 525/323, 321, 324, 314, 315, 247, 268, 285

(56) References Cited

U.S. PATENT DOCUMENTS

| 4,736,002 | * | 4/1988 | Allen et al. ........................... 526/125 |
| 4,784,983 | * | 11/1988 | Mao et al. . |
| 4,950,720 | * | 8/1990 | Randall, Jr. et al. . |
| 5,234,879 | * | 8/1993 | Garoff et al. . |

FOREIGN PATENT DOCUMENTS

| 0028076 | * | 5/1981 | (EP) . |
| 0029651 | * | 6/1981 | (EP) . |
| 0150450 | * | 8/1985 | (EP) . |
| 0202588 | * | 11/1986 | (EP) . |
| 2134122 | * | 8/1984 | (GB) . |
| 3-48214 | * | 7/1991 | (JP) . |

OTHER PUBLICATIONS

1996 Derwent Information Ltd. of JP Publication No. 61264012.*

Patent Abstract of JP 61–264012*

* cited by examiner

*Primary Examiner*—David W. Wu
*Assistant Examiner*—Tanya Zalukaeva
(74) *Attorney, Agent, or Firm*—Birch, Stewart, Kolasch & Birch, LLP

(57) ABSTRACT

The invention relates to a process for the preparation of a creep-resistant polypropylene by means of the following steps: (a) copolymerizing propylene and ethylene into a random copolymer at 40 to 110° C. using: a catalyst system of the above-mentioned type; a portion of ethylene or $C_4$–$C_{10}$-α-olefin leading to 1.0 to 10.0% by weight of ethylene repeating units in said random copolymer; and no or a minimal amount of hydrogen leading to a $MFR_{10}$ value of between 0.01 and 5.0 g/10 min for said random copolymer, if this step is performed first, or to a $MFR_2$ value for said polypropylene of between 0.05 and 0.40 g/10 min, if this step is performed after step (b); the proportion of random copolymer of this step being from 20 to 80% by weight of said polypropylene, (b) polymerizing propylene at 40 to 110° C. using: a catalyst system of the above-mentioned type; no or a minimal portion of ethylene leading to 0.0 to 1.0% by weight of ethylene repeating units in the polymer resulting from this step; and an amount of hydrogen leading to a $MFR_2$ value of between 30 and 300 g/10 min for said polymer, if this step is performed first, or to a $MFR_2$ value for said polypropylene of between 0.05 and 0.40 g/10 min, if this step is performed after step (a); the proportion of polymer of this step being from 80 to 20% by weight of said polypropylene.

31 Claims, No Drawings

PROCESS FOR THE PREPARATION OF CREEP-RESISTANT POLYPROPYLENE BLOCK COPOLYMERS

This application is the national phase under 35 U.S.C. §371 of prior PCT International Application No. PCT/FI97/00240 which has an International filing date of Apr. 18, 1997 which designated the United States of America, the entire contents of which are hereby incorporated by reference.

The invention relates to a process for the preparation of rigid polypropylene for e.g. pipe, fiber, profile and moulding applications, containing from 1.0 to 10.0% by weight of ethylene repeating units and having a $MFR_2$ value of between 0.05 and 0.40 g/10 min, by polymerizing propylene and ethylene or a $C_4$–$C_{10}$-α-olefin in the presence of a catalyst system, the procatalyst component of which is a reaction product of at least a tetravalent titanium compound and a magnesium halide compound and the cocatalyst component of which comprises an organoaluminium compound, and hydrogen as a molecular weight regulating agent, to give said polypropylene.

The invention also relates to a process for the preparation of elastomer modified polypropylene for e.g. pipe, fiber, profile and moulding applications, containing from 1.0 to 30% by weight of ethylene or a $C_4$–$C_{10}$-α-olefin repeating units and having a $MFR_2$ value of between 0.05 and 50 g/10 min, by polymerizing propylene and ethylene or a $C_4$–$C_{10}$-α-olefin in the presence of a catalyst system, the procatalyst component of which is a reaction product of at least a tetravalent titanium compound and a magnesium halide compound and the cocatalyst component of which comprises an organoaluminium compound, and hydrogen as a molecular weight regulating agent, as well as providing an elastomer component, to give said elastomer modified polypropylene.

Finally, the invention also relates to a creep-resistant polypropylene made by the above processes and its use.

By Melt Flow Rate (MFR) is meant the weight of a polymer extruded through a standard cylindrical die at a standard temperature in a laboratory rheometer carrying a standard piston and load. Thus MFR is a measure of the melt viscosity of a polymer and hence also of its molecular weight. The smaller the MFR, the larger is the molecular weight. It is frequently used for characterizing a polyolefins, e.g. polypropylene, where the standard conditions $MFR_{mi}$ are: temperature 230° C.; die dimensions 9.00 mm in length and 2.095 mm in diameter; load of the piston, 2.16 kg (mi=2), 5.0 kg (mi=5), 10.0 kg (mi=10), 21.6 kg (mi=21). See Alger, M. S. M., Polymer Science Dictionary, Elsevier 1990, p. 257. The standard generally used are ISO 1133 C4, ASTM D 1238 and DIN 53735.

By Flow Rate Ratio (FRR) is meant the ratio between the Melt Flow Rate (MFR) measured at a standard temperature and with standard die dimensions using a heavy load and the melt flow rate measured at the same temperature with the same die dimensions using a light load. Usually, for propylene polymers are used nominal loads 10.0 kg and 2.16 kg (ISO 1133 C4). The larger the value of the FRR, the broader the molecular weight distribution.

Polypropylene copolymer has many characteristics which makes it desirable for applications like pipes, fittings, moulded articles, foams etc. Polypropylene as piping material is mainly used in non-pressure applications (pipe and fittings) and profiles. There is a small volume used for pressure pipe, mainly hot water and industrial pipes. The good thermal resistance of polypropylene compared to other polyolefins is utilized for the pipe applications. All three main types of propylene polymer, i.e. homopolymers, random copolymers and block copolymers are used. Homopolymers give the pipe good rigidity but the impact and creep properties are not very good. The block copolymers give good impact properties but the creep properties are like homopolymers due to the homopolymer matrix. Propylene ethylene random copolymers are used for pressure pipe applications for hot water and industrial pipes.

The propylene-ethylene random copolymers for pressure pipes are today produced with high yield Ziegler-Natta catalysts in processes (bulk or gas phase) giving a material having a relatively narrow molecular weight distribution ($MWD=M_w/M_n$) of about 5, corresponding to a FRR ($MFR_{10}/MFR_2$) of 13–17. The molecular weight ($M_w$) of the pipe material with melt flow rate ($MFR_2$) of 0.1–0.4 is about 600000–1000000. This high molecular weight and the narrow MWD cause problems in compounding and extrusion of pipes. The processability of such materials is difficult due to the low shear sensitivity causing unwanted degradation of the material and melt fracture, which is seen as uneven surface and thickness variations of the pipes. In addition the conventional propylene random copolymer pipe materials produced in one phase have not strength enough for the short and long term properties (notch resistance and creep) needed for good pressure pipes.

The processability of the conventional propylene random copolymers can be improved by broadening the MWD using multi-stage polymerization processes. In multi-stage polymerization the MWD of the polymer can be broadened by producing different molecular weight polymers in each stage. The MWD of polymer becomes broader when lower molecular weight polymer is reactor-blended into the higher molecular weight polymer adjusting the final MFR by choosing the right molecular weight and the reactor split in each stage. The molecular weight of the polymer in each step can be controlled by hydrogen which acts as a chain transfer agent. Reactor temperature may be also used for controlling the molecular weight of polymer in each step. Multi-stage polymerization is disclosed e.g. in patent application JP-91048214, but the process concerns film grade polypropylene with a final $MFR_2$ of about 1.5.

When the processability is improved by producing broader MWD propylene random copolymer, also the amount of low molecular fraction is increased if the comonomer feeds are the same in each stage. The taste and odour are adversely affected.

By using a concept invented with high yield $TiCl_4$ catalyst it is possible to produce pipe material having improved mechanical and pipe properties and also a good extrudability. The improved strength properties of the material come from a very high molecular weight fraction of $Mw \geq 2000000$ g/mol and totally novel comonomer distribution together with a broad molecular weight distribution. In another embodiment of the invention, an elastomer is provided within this propylene product for increased impact strength.

The embodiment of the invention relating to a non-elastomeric polypropylene product is essentially characterized by what is said in the characterizing part of claim 1. Thus the invented concept is based on the idea of producing a broad MWD and a high molecular weight propylene random copolymer and improved comonomer distribution using high yield catalysts in two or several reactors at different reaction conditions. The comonomers incorporated in long chains as described in this invention destroy the regularity of the chains leading to the more homogenous distribution of the essential tie-chains and entanglements needed for creep properties and toughness in pipe materials.

The low molecular weight fraction contains no or minimal portion of ethylene repeating units in the polymer. Together with the high molecular weight random copolymer fraction this fraction is improving the processability. The no or low ethylene content fraction gives the total polymer the stiffness needed for rigid materials e.g. pipes, profiles and moulding applications.

A homopolymer or a minirandom copolymer (ethylene<1%) is known to have a stiffness of 1400–1700 MPa when a random copolymer with an ethylene content of $\geq 2\%$ has a stiffness of <1000 MPa.

The problem with the uneven comonomer distribution with high yield $TiCl_4$ catalysts is solved in a way that the amount of comonomer is split between the reactors. To the reactor where the high molecular weight propylene polymer is produced is fed more essentially all, comonomer compared to the reactor where the low molecular PP i produced. Higher amounts of comonomer can be fed because the solubility of the high molecular weight polymer is lower. The final comonomer content is adjusted by controlling the comonomer feed into the reactor. The intervals given in this publication always include both limits thereof.

Thus one embodiment of the present invention relates to a process for the preparation of polypropylene for e.g. pipe, fiber, profile and moulding applications. Such a grade of polypropylene has from 1.0 to 10.0% by weight of ethylene or a $C_4$–$C_{10}$-α-olefin repeating units and has a $MFR_2$ value of between 0.10 and 0.40 g/10 min. The preparation takes place by polymerizing propylene and ethylene or a $C_4$–$C_{10}$-α-olefin in the presence of a catalyst system, the procatalyst component of which is a reaction product of at least a tetravalent titanium compound and a magnesium halide compound, and a cocatalyst component of which comprises an organoaluminium compound, optionally an external electron donor and hydrogen as a molecular weight regulating agent.

It has been found that extremely creep-resistant polypropylene can be prepared by applying the following steps in any mutual order:
 (a) copolymerizing propylene and ethylene or a $C_4$–$C_{10}$-α-olefin into a random copolymer at 40 to 110° C. using: a catalyst system of the above-mentioned type; a portion of ethylene or $C_4$–$C_{10}$-α-olefin leading to 1.0 to 10.0% by weight of ethylene or $C_4$–$C_{10}$-α-olefin repeating units in said random copolymer; and no or a minimal amount of hydrogen leading to a $MFR_{10}$ value of between 0.01 and 5.0 g/10 min for said random copolymer, if this step is performed first, or to a $MFR_2$ value for said polypropylene of between 0.05 and 0.40 g/10 min, if this step is performed after step (b); the proportion of random copolymer of this step being from 20 to 80% by weight of said polypropylene,
 (b) polymerizing propylene at 40 to 110° C. using: a catalyst system of the above-mentioned type; no or a minimal portion of ethylene leading to 0.0 to 1.0% by weight of ethylene repeating units in the polymer resulting from this step; and an amount of hydrogen leading to a $MFR_2$ value of between 20 and 1000 g/10 min for said polymer, if this step is performed first, or to a $MFR_2$ value for said polypropylene of between 0.05 and 0.40 g/min, if this step is performed after step (a); the proportion of polymer of this step being from 80 to 20% by weight of said polypropylene.

In step (a) a very high molecular weight random copolymer of propylene and ethylene is prepared, which gives the polypropylene its extremely high shape-resistance. In step (b), essentially homopolymeric low molecular weight polypropylene is prepared, which gives the product good melt-processing properties and improved stiffness.

In the process of the invention the order of steps (a) and (b) can freely be chosen. According to one embodiment, step (a) is performed before step (b). According to another embodiment, step (b) is performed prior to step (a). When the low molecular weight PP homopolymer fraction is made in the first reactor and the high molecular weight random copolymer is made in the second reactor, (b)→(a), it gives certain advantages:
 In most cases it is easier to separate hydrogen than ethylene from the reaction mixture between the reactors.
 When ethylene is fed to the second reactor it increases the activity of the catalyst, which can be particularly important if the second reactor is a gas phase reactor.
 This order of polymerisation stages also ensure that there is no ethylene in the PP homopolymer, if that is wanted.
 It is easier to produce high comonomer content PP random copolymer. Typically more than 5% ethylene containing PP random copolymer is difficult to produce in loop.
 Circulation of the hydrogen in the back of the reactor is easier if the step (b) is made in gas phase reactor.

Although different catalyst systems of the above mentioned type can be used in steps (a) and (b), it is preferable to use the same catalyst system for both steps. According to a preferable embodiment, the catalyst system is added to step (a) and the same catalyst system is then used both in step (a) and (b).

Steps (a) and (b) can be performed in reactors, which may be of any type conventionally used for propylene polymerization and copolymerization, preferentially a loop (CSTR) or gas phase reactor, but it is most preferable to perform one of steps (a) and (b) in a loop (CSTR) reactor and the other step in a gas phase reactor, whereby any reaction medium used and unreactive reagents are removed at least partly between step (a) and step (b). In such a case the procatalyst (also called catalyst in the art), cocatalyst and external donor are fed to the loop reactor. An advantage of loop gas phase combination compared to two gas phase reactors in series is the flexibility of grade transfer transitions due to shorter residence time of loop reactor. An advantage of loop gas phase combination compared to two loop reactors in series is that in many cases of this invention either unreacted ethylene or hydrogen should be removed between the stages. This is typically made by evaporation the whole reaction medium and at least partial separation of gases and polymer particles, which is not feasible if both stages (a) and (b) are made in loop reactors. The reaction medium and unreacted reagents such as $H_2$ or comonomer can be removed by known methods between the steps.

It is also preferable to adjust the proportion of copolymer resulting from step (a) and the used melt flow (MFR) of step (a) and step (b) so that the FRR value ($MFR_{10}/MFR_2$), which is also a measure of the molecular weight distribution, of said polypropylene is between 10 and 100, most preferably between 20 and 50.

The catalyst used in the present process for the preparation of polypropylene can be any suitable catalyst, which consists of a procatalyst, which is a reaction product of at least tetravalent titanium compound and a magnesium halide compound, and a cocatalyst, which comprises an organoaluminium compound, an optionally external electron donor compound.

Preferentially, said catalyst system has been prepared by:
 (i) providing a procatalyst by reacting a magnesium halide compound, chosen from magnesium chloride, its complex with ethanol and other derivatives of magnesium chloride, with titanium tetrachloride and optionally with an internal donor, exemplified by the dialkyl phthalates, (ii) providing as cocatalyst an organoaluminium compound chosen from trialkyl aluminium exemplified by triethyl aluminium, dialkyl aluminium chloride, alkyl aluminium sesquichloride, optionally (iii) providing as at least one external donor an ester of an aromatic acid exemplified by methyl p-methyl benzoate, or an organosilicon compound exemplified by alkoxy silanes or blends thereof, and, optionally (iv) prepolymerizing a small amount of olefin by contacting the olefin with said procatalyst, cocatalyst and, optionally, the external donor.

In step (a) of the present process, a portion of ethylene is preferably used, which leads to 1.0 to 7.0% by weight of ethylene units in the random copolymer resulting from this step. Further in step (a) preferably no or a minimal amount of hydrogen is used, which leads to a $MFR_{10}$ value of between 0.05 and 2.0 g/min for the random copolymer resulting from this step, if the step is performed first. Also, the proportion of random copolymer resulting from step (a) is preferably from 40 to 80% by weight of said polypropylene. Thus it can be said, that the polypropylene prepared by the process of the invention contains preferably more random copolymer than low molecular weight homopolymer or minirandom copolymer.

In step (b), low molecular weight essentially homopolymeric propylene is produced. The molecular weight is adjusted by means of hydrogen. If the hydrogen amount is too high, the molecular weight will be too low and the product will be useless as pipe, profile or moulding material. In step (b) an amount of hydrogen is preferably used, which leads to a $MFR_2$ value of between 30 and 500 g/min for the polymer resulting from this step, if it performed first.

As it was said before, too much ethylene units in the low molecular weight component leads to difficulties in retaining good stiffness properties of the product. Thus, in step (b) no or a minimal amount of ethylene is used, which preferably leads to 0.0 to 0.5% by weight of ethylene repeating units in the polymer resulting from this step. Preferably, the low molecular weight homopolymer fraction is smaller that the high molecular weight random copolymer fraction, i.e. the proportion of polymer resulting from step (b) is from 60 to 20% by weight of said polypropylene.

According to another embodiment of the present invention, the invention relates to a process for the preparation of elastomer modified polypropylene for e.g. pipe, fiber, film, foam, profile and moulding applications. Such a grade of polypropylene has from 1.0 to 30% by weight of ethylene or a $C_4$–$C_{10}$-α-olefin repeating units and has a $MFR_2$ value of between 0.05 and 50 g/10 min. The preparation takes place by polymerizing propylene and ethylene or a $C_4$–$C_{10}$-α-olefin in the presence of a catalyst system, the procatalyst component of which is a reaction product of at least a tetravalent titanium compound and a magnesium halide compound, and a cocatalyst component of which comprises an organoaluminium compound, and hydrogen as a molecular weight regulating agent, as well as providing an elastomer component.

It has been found that extremely creep-resistant polypropylene can be prepared by applying the following steps:

(a) copolymerizing propylene and ethylene into a random copolymer at 40 to 110° C. using: a catalyst system of the above-mentioned type; a portion of ethylene or $C_4$–$C_{10}$-α-olefin leading to 1.0 to 10.0% by weight of ethylene or $C_4$–$C_{10}$-α-olefin repeating units in said random copolymer; and no or a minimal amount of hydrogen leading to a $MFR_{10}$ value of between 0.01 and 5.0 g/10 min for said random copolymer, if this step is performed first, or to a $MFR_2$ value for said polypropylene of between 0.05 and 50 g/10 min, if this step is performed after step (b); the proportion of random copolymer of this step being from 20 to 80% by weight of said polypropylene, (b) polymerizing propylene at 40 to 110° C. using: a catalyst system of the above-mentioned type; no or a minimal portion of ethylene leading to 0.0 to 1.0% by weight of ethylene repeating units in the polymer resulting from this step; and an amount of hydrogen leading to a $MFR_2$ value of between 20 and 1000 g/10 min for said polymer, if this step is performed first, or to a $MFR_2$ value for said polypropylene of between 0.05 and 50 g/10 min, if this step is performed after step (a); the proportion of polymer of this step being from 80 to 20% by weight of said polypropylene, and (c) providing a rubbery copolymer (elastomer) the proportion of which is from 5 to 40% by weight of said polypropylene.

In step (a) a very high molecular weight random copolymer of propylene and ethylene is prepared, which gives the polypropylene its extremely high shape-resistance. In step (b), essentially homopolymeric low molecular weight polypropylene is prepared, which gives the product good melt-processing properties and improved stiffness. In step (c), the provided rubbery copolymer gives better impact resistance.

In the process of the invention the order of steps (a) and (b) can freely be chosen. It is, however, preferable to perform step (a) before step (b). Although different catalyst systems of the above mentioned type can be used in steps (a) and (b), it is preferable to use the same catalyst system for both steps. According to a preferable embodiment, the catalyst system is added to step (a) and the same catalyst system is then used both in step (a) and (b).

Steps (a) and (b) can be performed in reactors, which may be of any type conventionally used for propylene polymerization and copolymerization preferentially a loop (CSTR) or gas phase reactor, but it is most preferable to perform one of steps (a) and (b) in a loop (CSTR) reactor and the other step in a gas phase reactor, whereby any reaction medium used and unreactive reagents are removed at least partly between step (a) and step (b). In such a case the procatalyst (also called catalyst in the art), cocatalyst and external donor is fed to the loop reactor. The reaction medium and unreacted reagents such as $H_2$ or comonomer can be removed by known methods between the steps.

Preferably, steps (a) and (b) are performed so that said polypropylene has a $MFR_2$ value of between 0.1 and 12 g/10 min.

It is also preferable to adjust the proportion of copolymer resulting from step (a) and the used melt flow (MFR) of step (a) and step (b) so that the FRR value ($MFR_{10}/MFR_2$), which is also a measure of the molecular weight distribution, of said polypropylene is between 10 and 100, most preferably between 20 and 50.

The catalyst used in the present process for the preparation of polypropylene can be any suitable catalyst, which consists of a procatalyst, which is a reaction product of at least tetravalent titanium compound and a magnesium halide compound, and a cocatalyst, which comprises an organoaluminium compound, an optionally external electron donor compound.

Preferentially, said catalyst system has been prepared by:
(i) providing a procatalyst by reacting a magnesium halide compound, chosen from magnesium chloride, its complex with ethanol and other derivatives of magnesium chloride, with titanium tetrachloride and optionally with an internal donor, exemplified by the dialkyl phthalates,
(ii) providing as cocatalyst an organoaluminium compound chosen from trialkyl aluminium exemplified by triethyl aluminium, dialkyl aluminium chloride, alkyl aluminium sesquichloride, optionally
(iii) providing as at least one external donor an ester of an aromatic acid exemplified by methyl p-methyl benzoate, or an organosilicon compound exemplified by alkoxy silanes or blends thereof, and, optionally
(iv) prepolymerizing a small amount of olefin by contacting the olefin with said procatalyst, cocatalyst and, optionally, the external donor.

In step (a) of the present process, a portion of ethylene or a $C_4$–$C_{10}$-α-olefin is preferably used, which leads to 1.0 to 7.0% by weight of ethylene or a $C_4$–$C_{10}$-α-olefin units in the random copolymer resulting from this step. Further in step (a) preferably no or a minimal amount of hydrogen is used, which leads to a $MFR_{10}$ value of between 0.05 and 2.0 g/min for the random copolymer resulting from this step, if the step is performed first. Also, the proportion of random copolymer resulting from step (a) is preferably from 40 to 80% by weight of said polypropylene. Thus it can be said, that the polypropylene prepared by the process of the invention contains preferably more random copolymer than low molecular weight homopolymer or minirandom copolymer.

In step (b), low molecular weight essentially homopolymeric or minirandom (having little comonomer) propylene is produced. The molecular weight is adjusted by means of hydrogen. If the hydrogen amount is too high, the molecular weight will be too low and the product will be useless as pipe, profile or moulding material. In step (b) an amount of hydrogen is preferably used, which leads to a $MFR_2$ value of between 30 and 500 g/10 min for the polymer resulting from this step, if it performed first.

As it was said before, too much ethylene units in the low molecular weight component leads to difficulties in retaining the stiffness properties of the product. Thus, in step (b) no or a minimal amount of ethylene is used, which preferably leads to 0.0 to 0.5% by weight of ethylene repeating units in the polymer resulting from this step. Preferably, the low molecular weight homopolymer fraction is smaller that the high molecular weight random copolymer fraction, i.e. the proportion of polymer resulting from step (b) is from 60 to 20% by weight of said polypropylene.

The step (c) of providing an elastomer preferably follows steps (a) and (b) and, most preferentially, the order of steps is (a)→(b)→(c).

The step (c) of providing an elastomer can be performed in two ways. According to the first and more preferable way, said elastomer is provided by copolymerizing at least propylene and ethylene into an elastomer. The conditions for the copolymerization are within the limits of conventional EPM production conditions such as they are disclosed e.g. in *Encyclopedia of Polymer Science and Engineering*, Second Edition, Vol. 6, p. 545–558. A rubbery product is formed if the ethylene repeating unit content in the polymer is within a certain interval. Thus, preferentially, in step (c), ethylene and propylene are copolymerized into an elastomer in such a ratio that the copolymer step (c) contains from 10 to 70% by weight of ethylene units. Most preferably, the ethylene unit content is from 30 to 50% by weight of the copolymeric propylene/ethylene elastomer.

According to preferable embodiments of the invention, the following conditions are independently chosen for the three step process:
a temperature in step (c) of between 40 and 90° C.,
said catalyst system is added to step (a) and used in both steps (a), (b) and (c),
step (a) is performed in a loop (CSTR) reactor and steps (b) and (c) are performed in two separate gas phase reactors,
the added comonomer portion is adjusted so that the proportion of ethylene repeating units after steps (a) and (b) is from 1 to 4% by weight and the proportion of ethylene repeating units after steps (a), (b) and (c) is from 5 to 15% by weight,
in step (c), ethylene and propylene are copolymerized into an elastomer in a molar ratio ethylene/propylene of between 30/70–50/50.

According to another embodiment of the claimed process, the elastomer in step (c) is provided by adding a ready-made or natural elastomer to the reaction product of steps (a) and (b), most preferably an impact modified heterophasic polypropylene having from 15 to 50% by weight of a propylene-ethylene elastomeric copolymer.

As polypropylene for pipe, profile and moulding applications has not before been prepared with such a good shape preservance, the invention also relates to an extremely creep-resistant polypropylene for said applications. The creep resistance can be measured by registering the deflection of the material during 500–1000 h using 7.3 or 6.5 MPa load at 60° C. This new material shows a creep level of ⅕ to ½ of regular PP (pipe grade) material comparable to e.g. the PP material of comparative example 9. This is a sensational result and can open new application in e.g. piping.

According to one embodiment of the invention, the creep-resistant polypropylene has been made according to the above described process for its preparation. According to another embodiment of the invention, the use of the above mentioned polypropylene is claimed, which use is directed to pipes, profiles, moulded articles and foams, fibres and films.

In addition to ethylene and propylene, the process and the polypropylene according to the invention can contain from 0.0 to 10.0% by weight of any other olefin such as butene-1, 4-methyl-pentene-1, hexene-1, octene-1 and decene-1 or combinations of them.

The stiffness of this material is higher than that for materials produced with about the same comonomer content in several reactors or in only one reactor without loosing the impact. That is seen best when comparing the embodiment examples 1 to 10 with comparative examples 1 to 3 which are produced in the same conditions but with different ethylene feed splits. The entanglements and tie-chains of the high molecular fraction in the material give the material better pipe properties especially higher tensile strength tensile modulus charpy impact strength, and lower creep under load. The invented copolymers give also longer time to failure at same hoop stress levels in standard pipe pressure tests than the conventionally produced random pipe material.

The invention is in the following illuminated by the following examples and comparative examples.

EXAMPLES

The following tests and preparations were made:
Mechanical tests from 4 mm compression moulded plaques. The specimens were according to ISO 527.
Tensile strength according to ISO 527 (cross head speed= 50 mm/min).
Tensile modules according to ISO 527 (cross head speed=1 mm/min).
Charpy, notched impact according to ISO 179/1 eA.
Creep test is a Borealis tensile creep method for ranking of pipe materials. In the method a constant stress is applied to a specimen (a modified ISO dumb bell=120 mm long, thickness=2 mm). The test temperature=60° C. (oven) and the stress=6.5 or 7.3 mPa (for PP materials).
The increase of strain with time is recorded 500 to 1000 h.
The creep is defined as the elongation at 100 h in mm units corresponding to stiffness and the slope between 100 h and 400 h in angle units.
This creep resistance test method is comparable to e.g. ISO 899-1, DIN 53444 and ASTM 2990.

Example 1
Preparation and Properties of High MW Very Broad MWD Two-Stage Random Homo-PP Copolymer The PP copolymers were produced in a pilot plant having a loop reactor and a fluid bed gas phase reactor connected in series. The catalyst, cocatalyst and donor were fed to the loop reactor. The reaction medium of loop was flashed away before the solid polymer containing the active catalyst entered to the gas phase.

The prepolymerized $MgCl_2$-supported Ti catalyst (prepared according to patent U.S. Pat. No. 5,234,879, included by reference) was used in the polymerization. Cocatalyst was triethyl aluminium (TEA) and external donor dicyclopentanedimethoxysilane (DCPDMS). Al/Ti mole ratio was 150 and Al/donor mole ratio 5.

In the first stage (loop reactor) was produced high MW propylene-ethylene random copolymer, and the polymerization was continued in the second stage (gas phase reactor) which produced low MW homo-PP. The polymerization temperature used in both stages was 70° C. The production rate was 6 kg/h for the first stage and 4 kg/h for the second stage, which means a production split of 60/40. The MFR:s of the first stage and final product were adjusted with separate hydrogen feeds.

More detailed properties of the material produced in each stage are shown in Table 1.

Example 2
Preparation and Properties of Moderately Broad MWD Two-Stage Random Homo-PP Copolymer The polymer was polymerized as in example 1, except that the production split was 80/20 and the MW of the random PP produced in the first stage was adjusted slightly lower with hydrogen feed. More detailed properties of the material produced in each stage are shown in Table 1.

Example 3
Preparation and Properties of Very Broad MWD Two-Stage Random Minirandom-PP Copolymer The polymer was polymerized as in Example 1, except that the production split was 61/39, and instead of homo-PP the second stage produced propylene-ethylene random copolymer containing 0.5 w-% ethylene. More detailed properties of the material produced in each stage are shown in Table 1.

Example 4
Preparation and Properties of Broad MWD Two Stage Homo-Random-PP Copolymer The polymer was polymerized as in Example 1, except that the first stage (loop reactor) produced low MW homo-PP and the second stage high MW propylene-ethylene random copolymer containing about 4 w-% ethylene. The production split was 41/59. More detailed properties of the material produced in each stage are shown in Table 1.

Example 5
Preparation and Properties of Moderately Broad MWD Two-Stage Random Homo-PP Copolymer with Another Catalyst and Higher Ethylene Content Random-PP The polymer was polymerized as in Example 1, except that the catalyst was prepared according to patent U.S. Pat. No. 4,784,983, included by reference, and the high MW random-PP produced in the first stage had higher ethylene content and slightly lower MW. More detailed properties of the material produced in each stage are shown in Table 1.

Example 6
Preparation and Properties of Medium Broad MWD Two-Stage Random Homo-PP Copolymer The polymer was polymerized as in Example 1, except that the production split was 59/41, the MW of the random-PP produced in the first stage was adjusted slightly lower and that as external donor, cyclohexyl methyl dimethoxy silane was used. More detailed properties of the material produced in each stage are shown in Table 1.

Example 7
Preparation and Properties of Moderately Broad MWD Two-Stage Random Homo-PP Copolymer with a Higher Amount of the Homopolymer Produced The polymer was polymerized as in Example 1, except that the production split was 42/58. More detailed properties of the material produced in each stage are shown in Table 1.

Example 8
Preparation and Properties of Moderately Broad MWD Two-Stage Random Homo-PP Copolymer with a Lower Ethylene Content Random PP Copolymer The polymer was polymerized as in Example 1, except that the high MW random PP produced in the first stage had lower ethylene content and the production split was 50/50. More detailed properties of the material produced in each stage are shown in Table 1.

Example 9
Preparation and Properties of Broad MWD Two-Stage Homo-Random PP Copolymer The polymer was polymerized as in Example 1, except that the first stage (loop reactor) produced low MW homo-PP and the second stage high MW propylene-1-butene-ethylene random copolymer containing about 1.1 w-% 1-butene and 0.6 w-% ethylene. The production split was 50/50. More detailed properties of the material produced in each stage are shown in Table 1.

Example 10
Preparation and Properties of Broad MWD Three-Stage Impact Modified Random Homo-PP Copolymer The PP copolymers were produced in a pilot plant having a loop reactor and two fluid bed gas phase reactors connected in series. The catalyst, cocatalyst and donor were fed to the loop reactor. The reaction medium of loop was flashed away before the solid polymer containing the active catalyst entered to the first gas phase.

The prepolymerized MgCl$_2$-supported Ti catalyst (prepared according to patent U.S. Pat. No. 5,234,879, included by reference) was used in the polymerization. Cocatalyst was triethyl aluminium (TEA) and external donor cyclohexyl methyl dimethoxy silane.

In the first stage (loop reactor) was produced high MW propylene-ethylene random copolymer. The polymerization was continued in the second stage (gas phase reactor) which produced low MW homo-PP, and the third stage (gas phase) produced rubbery ethylene-propylene copolymer. The ethylene/propylene mole ratio in the third stage was 30/70. The production split of the stages in weight fractions was 57/26/17. The polymerization temperature used in all stages was 70° C. The MFR:s measured after the polymerization stages were adjusted with separate hydrogen feeds.

More detailed properties of the material produced in each stage are shown in Table 2.

Example 11
Preparation and Properties of Broad MWD Three-Stage Impact Modified Random Homo-PP Copolymer Having Smaller Fraction of Homo-PP and Larger Fraction of Rubbery Copolymer The polymer was polymerized as in Example 7, except that the production split was 63/12/25 and the MW of the random-PP produced in the loop reactor was adjusted lower with small hydrogen feed. The ethylene/propylene mole ratio in the third stage was 36/64. More detailed properties of the material produced in each stage are shown in Table 2.

Example 12
Preparation and Properties of Broad MWD Three-Stage Impact Modified Random-PP Copolymer, with Low Ethylene Random-PP Made in the Second Stage The polymer was polymerized as in Example 8, except that the production split was 58/29/13, and instead of homo-PP the second stage produced low MW propylene-ethylene random copolymer containing 0.5 w-% ethylene. More detailed properties of the material produced in each stage are shown in Table 2.

Example 13
Preparation and Properties of Broad MWD Three-Stage Impact Modified Homo-Random-PP Copolymer The polymer was polymerized as in Example 9, except that the first stage (loop reactor) produced low MW homo-PP and the second stage (gas phase reactor) produced high MW propylene-ethylene random copolymer containing about 4 w-% ethylene, and the third stage (gas phase reactor) produced rubbery ethylene-propylene copolymer. The ethylene/propylene mole ratio in the third stage was 33/67. The production split was 36/48/15. As an external donor, dicyclopentanedimethoxysilane (DCPDMS) was used. More detailed properties of the material produced in each stage are shown in Table 2.

Example 14
Preparation and Properties of Broad MWD Two-Stage Random Homo-PP Copolymer Which is Impact Modified with Melt Blended PP Block Copolymer The polymer composition is a melt blended mixture of 67 w-% of PP random copolymer made according to example 2 and 33 w-% of a impactmodified heterophasic PP (MFR2 1.5 g/10 min) having 15 w-% of rubbery propylene-ethylene copolymer. More detailed properties of the material produced in each stage are shown in Table 2.

Comparative Example 1
Preparation and Properties of Moderately Broad MWD Two-Stage Random-PP Copolymer with Higher Ethylene Content of the Low MW Phase The polymer was polymerized as in Example 3, except that the ethylene content of the low MW polymer produced in the second stage was higher, and the MW of the polymer produced in the first stage was slightly lower. The external donor was cyclohexylmethyl dimethoxysilane. The production split was 60/40. More detailed properties of the material produced in each stage are shown in Table 1.

Comparative Example 2

The following material was tested: Borealis commercial PP-pipe grade, RA130E, which is used for hot water pressure pipes.

Comparative Example 3
Preparation and Properties of Impact Modified Low Ethylene Random-PP Copolymer The PP copolymers were produced in a pilot plant having a loop reactor and a fluid bed gas phase reactor connected in series. The catalyst, cocatalyst and donor were fed to the loop reactor. The reaction medium of loop was flashed away before the solid polymer containing the active catalyst entered to the gas phase. The polymerization temperature used in both reactors was 70° C.

The prepolymerized MgCl$_2$-supported Ti catalyst (prepared according to patent U.S. Pat. No. 5,234,879, included by reference) was used in the polymerization. Cocatalyst was triethyl aluminium (TEA) and external donor dicyclopentanedimethoxysilane (DCPDMS).

In the first stage (loop reactor) was produced propylene-ethylene random copolymer of 4% ethylene, and the polymerization was continued in the second stage (gas phase reactor) which produced rubbery propylene-ethylene copolymer. The ethylene/propylene mole ratio in the third stage was 35/65. The production rate in the first stage was 11 kg/h and in the second stage 2.1 kg/h, which means a production split of 84/16. The MFR:s of the first stage and final product were adjusted with separate hydrogen feeds.

More detailed properties of the material produced in each stage are shown in Table 2.

Comparative Example 4
Preparation and Properties of Impact-Modified Propylene-Ethylene Random Copolymer with Higher MW of the Rubbery Phase The polymer was polymerized as in comparative Example 3, except that the rubbery propylene-ethylene copolymer was produced without any hydrogen feed to the gas phase reactor. More detailed properties of the material produced in each stage are shown in Table 2.

TABLE 1

RANDOM HOMO PP COPOLYMERS for pipe (homo random PP copolymers)

|  |  | Ex. 1 | Ex. 2 | Ex. 3 | Ex. 4 | Ex. 5 | Ex. 6 | Ex. 7 | Ex. 8 | Ex. 9 | Comp. 1 | Comp. 2 |
|---|---|---|---|---|---|---|---|---|---|---|---|---|
| MFR, 2.16 kg | g/10' | 0.14 | 0.18 | 0.16 | 0.15 | 0.19 | 0.29 | 0.2 | 0.2 | 0.5 | 0.15 | 0.18 |
| MFR, 10 kg | g/10' | 7 | 4 | 6.9 | 5.6 | 4.5 | 8.7 | 5.3 |  | 10.4 | 4.7 |  |
| FRR, 10/2.16 |  | 50 | 22.2 | 43.1 | 37.1 | 23.9 | 30 | 26.5 |  | 20.8 | 31.3 |  |
| FINAL ETHENE | w-% | 1.8 | 3 | 2.6 | 2.7 | 2.9 | 2.3 | 1.6 | 1.35 | 0.6 | 3.4 | 3.6 |
| 1. stage, ethene | w-% | 4 | 4 | 3.9 | 0 | 5.8 | 3.9 | 4 | 2 | 0 | 4 | 4 |
| final butene | w-% |  |  |  |  |  |  |  |  | 1.1 |  |  |
| Melting peak, Tm | C | 161.2 | 161.3 | 149 | 161.4/154.4 | 159.7 | 155.1/160.9 | 159.6 | 157.3 | 160.6 | 147.2 | 141.9 |
| Tensile strength | MPa | 30 | 25.4 | 28.1 | 27.9 | 27.6 | 27.5 | 30.6 | 34 | 35.6 | 23.9 | 22.2 |
| elongation at yield | % | 8.7 | 10.5 | 10.8 | 9.7 | 9.4 | 10 | 9.4 | 9 | 7.3 | 14.5 | 12.3 |
| Tensile modulus | MPa | 1320 | 1010 | 1140 | 1110 | 1080 | 970 | 1360 | 1520 | 1730 | 870 | 790 |
| Charpy, notched, RT | kJ/m$^2$ | 6.4 | 10.1 | 5.8 | 8.1 | 83 | 10.7 | 9.3 | 4.6 | 2.3 | 40 | 11.3 |
| Charpy, notched, 0° C. | kJ/m$^2$ | 2.1 | 2.6 | 2 | 2.3 | 2 | 3.1 | 21.7 |  |  | 2.2 | 2 |
| Creep at 60° C. 7.3 MPa displacement at 100 h/slope | mm/deg | 0.6/0.74 | 0.6/1.0 | 1.0/1.0 | 0.9/0.6 | 1.1/0.6 | 1.1/0.66 | 0.9/0.62 | 0.8/0.54 | 0.4/0.4 | 2.2/2.0 | 2.6/2.0 |
| 1. stage, MFR, 10 kg, a→b | g/10' | 0.09 | 0.94 | 0.19 | — | 0.3 | 1.7 | 0.17 | 0.23 | 21 | 0.2 | 0.9 |
| 1. stage, MFR, 2.16 kg, b→a | g/10' |  |  |  | 105 |  |  |  |  |  |  |  |
| Production split | %/% | 60/40 | 80/20 | 61/39 | 41/59 | 60/40 | 59/41 | 42/58 | 50/50 | 50/50 | 60/40 | 60/40 |

TABLE 2

IMPACT MODIFIED RANDOM HOMO PP COPOLYMERS (impact modified homo random PP co)

|  |  | Ex. 10 | Ex. 11 | Ex. 12 | Ex. 13 | Ex. 14 | Comp. 3 | Comp. 4 |
|---|---|---|---|---|---|---|---|---|
| MFR 2.16 kg | g/10' | 0.13 | 0.14 | 0.19 | 0.16 | 0.4 | 0.2 | 0.18 |
| MFR. 10 kg | g/10' | 3.6 | 3.7 | 5.7 | 5.8 | 9.9 | 3.3 | 3.1 |
| FRR. 10/2.16 |  | 27.4 | 26.4 | 30 | 36 | 24.7 | 16.6 | 17.4 |
| FINAL ETHENE | w-% | 4.9 | 6.8 | 6.8 | 7.5 |  | 6.9 | 7.7 |
| 2. stage, ethene | w-% | 1.5 | 1.7 | 1.8 | 2.8 |  | — | — |
| 1. stage. ethene | w-% | 3.2 | 3.5 | 3.2 | 0 |  | 0.8 | 0.8 |
| Melting peak. Tm | °C. | 154.7 | 154.6 | 150.9 | 158 |  | 155.7 | 155.3 |
| Tensile strength | MPa | 23.3 | 21.3 | 21.7 | 20.5 | 26.1 | 22.7 | 20.7 |
| elongation at yield | % | 9.8 | 9.2 | 10.5 | 7.5 | 9.1 | 7.8 | 7.7 |
| Tensile modulus | MPa | 940 | 860 | 860 | 880 | 1070 | 1010 | 960 |
| Charpy. notched, RT | kJ/m$^2$ | 53 | 69 | 66 | 56 | 24 | 55 | 54 |
| Charpy. notched, 0° C. | kJ/m$^2$ | 6 | 18.1 | 6.9 | 11.2 | 3.9 | 24.2 | 13.4 |
| Charpy. notched. −20° C. | kJ/m$^2$ | 2.3 | 3.7 | 3.4 | 5.2 | — | 7.5 | 8.1 |
| Creep at 60 C., 7.3 MPa displacement at 100 h/slope | mm/deg | 2.5/2.3 | 3.2/5.1 | 4.0/8.0 | — | 1.5/1.1 | 2.2/4.4 | 6/ — |
| creep at 60° C., 6.5 MPa | mm/deg |  |  |  | 2.2/3.1 |  |  |  |
| Extrudability |  | good | good | good | good | — | bad | severe |
| 1. stage MFR, 2.16 kg b→a | g/10' | — | — | — | 90 | — | 0.2 | 0.27 |
| 1. stage MFR, 10 kg, a→b | g/10' | 0.7 | 0.7 | 0.7 | — |  |  |  |
| 2. stage MFR, 2.16 kg | g/10' | 0.1 | 0.2 | 0.3 | 0.45 |  | — | — |
| Production split | %/% | 58/26/16 | 63/12/25 | 58/29/13 | 36/48/15 | 53/42/5 | 84/16 | 84/16 |

What is claimed is:

1. A process for the production of polypropylene containing from 1.0 to 10.0% by weight of ethylene or $C_4$–$C_{10}$-α-olefin repeating units having a $MFR_2$ value of between 0.05 and 0.40 g/10 min, which comprises the following steps in either order:

(a) copolymerizing propylene and ethylene or a $C_4$–$C_{10}$-α-olefin into a random copolymer at 40 to 110° C. using: (1) a catalyst system; (2) a portion of ethylene or $C_4$–$C_{10}$-α-olefin leading to 1.0 to 10.0% by weight of ethylene or $C_4$–$C_{10}$-α-olefin repeating units in said random copolymer; and (3) if this step (a) is performed first, a minimal amount of or no hydrogen leading to a $MFR_{10}$ value of between 0.01 and 5.0 g/10 min for said random copolymer, or (3) if this step (a) is performed after step (b), a minimal amount of or no hydrogen leading to a $MFR_2$ value for said polypropylene of between 0.05 and 0.40 g/10 min; the proportion of random copolymer of this step (a) being from 40 to 80% by weight of said polypropylene; and (b) polymerizing propylene at 40 to 110° C. using: (1) a catalyst system; (2) a minimal portion of or no ethylene leading to 0.0 to 1.0% by weight of ethylene repeating units in the polymer resulting from this step; and (3) if this step (b) is performed first, an amount of hydrogen leading to a $MFR_2$ value of between 20 and 1000 g/10 min for said polymer, or (3) if this step (b) is performed after step (a), an amount of hydrogen leading to a $MFR_2$ value for said polypropylene of between 0.05 and 0.40 g/10 min; the proportion of polymer of this step (b) being from 60 to 20% by weight if said polypropylene, wherein the catalyst system has a procatalyst component, which is a reaction product of at least a tetravalent titanium compound and a magnesium halide compound, a cocatalyst component, which comprises an organoaluminum compound, and optionally, an external donor, and wherein hydrogen is used as a molecular weight regulating agent.

2. Process according to claim 1, wherein the order of steps is first step (a) and second step (b).

3. Process according to claim 2, wherein said catalyst system is added to step (a) and the same catalyst system is then used both in step (a) and (b).

4. Process according to claim 1, wherein the order of steps is first step (b) and second step (a).

5. Process according to claim 4, wherein said catalyst system is added to step (b) and the same catalyst system is then used both in step (b) and (a).

6. Process according to claim 1, wherein step (a) is performed in a loop (CSTR) reactor and step (b) is performed in a gas phase reactor, whereby any reaction medium used and any reagents are removed at least partly between step (a) and step (b).

7. Process according to claim 1, wherein the proportion of copolymer resulting from step (a) and the MFR values of step (a) and step (b) are such that the FRR value which is $MFR_{10}/MFR_2$ of said polypropylene is between 10 and 100.

8. Process according to claim 1, wherein said catalyst system has been prepared by:
(i) providing a procatalyst by reacting a magnesium halide compound, chosen from magnesium chloride, its complex with ethanol and other derivatives of magnesium chloride, with titanium tetrachloride and optionally with an internal donor,
(ii) providing as cocatalyst an organoaluminum compound chosen from trialkyl aluminum, optionally
(iii) providing as at least one external donor an ester of an aromatic acid, and, optionally
(iv) prepolymerizing a small amount of olefin by contacting the olefin with said procatalyst and optionally, the external donor.

9. Process according to claim 1, wherein in step (a), a portion of ethylene is used, which leads to 1.0 to 7.0% by weight of ethylene units in the random copolymer resulting from this step.

10. Process according to claim 1, wherein in step (a), no or a minimal amount of hydrogen is used, which leads to a $MFR_{10}$ value of between 0.05 and 2.0 g/10 min for the random copolymer resulting from this step, if the step is performed first.

11. Process according to claim 1, wherein in step (b), no or minimal amount of ethylene is used, which leads to 0.0 to 0.5% by weight of ethylene repeating units in the polymer resulting from this step.

12. Process according to claim 1, wherein in step (b), an amount of hydrogen is used, which leads to a $MFR_2$ value between 30 and 500 g/10 min for the polymer resulting from this step, if it is performed first.

13. A process for the preparation of elastomer modified polypropylene containing from 1.0 to 30% by weight of ethylene or $C_4$–$C_{10}$-α-olefin repeating units having a $MFR_2$ value of between 0.05 and 50 g/10 min, which comprises the following steps (a), (b) and (c) with steps (a) and (b) being in either order:

(a) copolymerizing propylene and ethylene or a $C_4$–$C_{10}$-α-olefin into a random copolymer at 40 to 110° C.

using: (1) a catalyst system; (2) a portion of ethylene or $C_4$–$C_{10}$-α-olefin leading to 1.0 to 10.0% by weight of ethylene or $C_4$–$C_{10}$-α-olefin repeating units in said random copolymer; and (3) if this step (a) is performed first, a minimal amount of hydrogen leading to a $MFR_{10}$ value of between 0.01 and 5.0 g/10 min for said random copolymer, or (3) if this step (a) is performed after step (b), a minimal amount of or no hydrogen leading to a $MFR_2$ value for said polypropylene of between 0.05 and 0.40 g/10 min; the proportion of random copolymer of this step (a) being from 40 to 80% by weight of said polypropylene, (b) polymerizing propylene at 40 to 110° C. using: (1) a catalyst system; (2) a minimal portion of or no ethylene leading to 0.0 to 1.0% by weight of ethylene repeating units in the polymer resulting from this step; and (3) if this step (b) is performed first, an amount of hydrogen leading to a $MFR_2$ value of between 20 and 1000 g/10 min for said polymer, or (3) if this step (b) is performed after step (a), an amount of hydrogen leading to a $MFR_2$ value for said polypropylene of between 0.05 and 50 g/10 min; the proportion of polymer of this step (b) being from 60 to 20% by weight if said polypropylene, (c) providing a rubbery copolymer, the proportion of which is from 5 to 40% by weight of said polypropylene, to give said elastomer modified polypropylene, wherein the catalyst system has a procatalyst component, which is a reaction product of at least a tetravalent titanium compound and a magnesium halide compound, a cocatalyst component, which comprises an organoaluminum compound, and optionally, an external donor, and wherein hydrogen is used as a molecular weight regulating agent.

14. Process according to claim 13, wherein the order of steps (a) and (b) is first step (a) and thereafter step (b).

15. Process according to claim 13, wherein said catalyst system is added to step (a) and the same catalyst system is then used both in step (a) and (b).

16. Process according to claim 13, wherein the order of steps (a) and (b) is first step (b) and thereafter step (a).

17. Process according to claim 13, wherein said catalyst system is added to step (b) and the same catalyst system is then used both in step (b) and (a).

18. Process according to claim 13, wherein step (a) is performed in a loop (CSTR) reactor and step (b) is performed in a gas phase reactor, whereby any reaction medium used and any reagents are removed at least partly between step (a) and step (b).

19. Process according to claim 13, wherein the proportion of copolymer resulting from step (a) and the MFR values of step (a) and step (b) are such that the FRR value which is $MFR_{10}/MFR_2$ of said polypropylene is between 10 and 100.

20. Process according to claim 13, wherein said catalyst system has been prepared by:
(i) providing a procatalyst by reacting a magnesium halide compound, chosen from magnesium chloride, its complex with ethanol and other derivatives of magnesium chloride, with titanium tetrachloride and optionally with an internal donor,
(ii) providing as cocatalyst an organoaluminum compound chosen from trialkyl aluminum, optionally
(iii) providing as at least one external donor an ester of an aromatic acid, and, optionally
(iv) prepolymerizing a small amount of olefin by contacting the olefin with said procatalyst and optionally, the external donor.

21. Process according to claim 13, wherein in step (a), a portion of ethylene is used, which leads to 1.0 to 7.0% by weight of ethylene units in the random copolymer resulting from this step.

22. Process according to claim 13, wherein in step (a), no or a minimal amount of hydrogen is used, which leads to a $MFR_{10}$ value of between 0.05 and 2.0 g/10 min for the random copolymer resulting from this step, if the step is performed first.

23. Process according to claim 1, wherein in step (b), no or minimal amount of ethylene is used, which leads to 0.0 to 0.5% by weight of ethylene repeating units in the polymer resulting from this step.

24. Process according to claim 13, wherein in step (b), an amount of hydrogen is used, which leads to a $MFR_2$ value between 30 and 500 g/10 min for the polymer resulting from this step, if it is performed first.

25. Process according to claim 13, wherein step (c) follows steps (a) and (b) with step (a) first.

26. Process according to claim 13, wherein in step (c), said elastomer is provided by copolymerizing at least propylene and ethylene into an elastomer.

27. A process according to claim 26, wherein in step (c), ethylene and propylene are copolymerized into an elastomer in such a ratio, that the copolymer of step (c) contains from 10 to 70% by weight of ethylene units.

28. A process according to claim 26, wherein in that the following conditions are independently chosen for the three-step process:

a temperature in step (c) of between 40 and 90° C., said catalyst system is added to step (a) and used in both steps (a), (b) and (c), step (a) is performed in a loop (CSTR) reactor and steps (b) and (c) are performed in two separate gas phase reactors, the added comonomer portion is adjusted so that the proportion of ethylene repeating units after steps (a) and (b) is from 1 to 4% by weight and the proportion of ethylene repeating units after steps (a), (b) and (c) is from 5 to 15% by weight, in step (c), ethylene and propylene are copolymerized into an elastomer in a molar ratio ethylene/propylene of between 30/70–50/50.

29. A process according to claim 13, wherein in step (c), the elastomer is provided by adding a ready made natural elastomer to the reaction product of steps (a) and (b).

30. A process according to claim 29, wherein in step (c), the added ready made elastomer is an impact modified polyolefin.

31. A process according to claim 13, wherein in step (c) said impact modified polyolefin is an impact-modified heterophasic polypropylene having from 5 to 30% by weight of a propylene-ethylene elastomeric copolymer.

* * * * *